United States Patent
Garth et al.

(10) Patent No.: US 10,114,674 B2
(45) Date of Patent: Oct. 30, 2018

(54) SORTING DATABASE COLLECTIONS FOR PARALLEL PROCESSING

(71) Applicant: International Business Machines Corporation, Armonk, NY (US)

(72) Inventors: John M. Garth, Henderson, NV (US); Christian Michel, Sindelfingen (DE)

(73) Assignee: International Business Machines Corporation, Armonk, NY (US)

( * ) Notice: Subject to any disclaimer, the term of this patent is extended or adjusted under 35 U.S.C. 154(b) by 452 days.

(21) Appl. No.: 14/199,851

(22) Filed: Mar. 6, 2014

(65) Prior Publication Data

US 2015/0254288 A1  Sep. 10, 2015

(51) Int. Cl.
  *G06F 17/30* (2006.01)
  *G06F 9/50* (2006.01)

(52) U.S. Cl.
  CPC ...... *G06F 9/5005* (2013.01); *G06F 17/30445* (2013.01)

(58) Field of Classification Search
  CPC .................................................. G06F 17/30445
  USPC ....................................................... 707/753
  See application file for complete search history.

(56) References Cited

U.S. PATENT DOCUMENTS

| | | | | |
|---|---|---|---|---|
| 5,742,806 A * | 4/1998 | Reiner | ............... | G06F 17/30445 |
| 5,842,208 A * | 11/1998 | Blank | ............... | G06F 17/30321 |
| 5,890,166 A * | 3/1999 | Eisenberg | ......... | G06F 17/30309 |
| 6,272,486 B1 * | 8/2001 | Garth | ................... | G06F 9/5016 |
| 6,567,816 B1 * | 5/2003 | Desai | ................ | G06F 17/30569 |
| 6,708,166 B1 * | 3/2004 | Dysart | .............. | G06F 17/30607 707/758 |
| 7,146,360 B2 | 12/2006 | Allen et al. | | |
| 8,321,476 B2 | 11/2012 | Kirk et al. | | |
| 8,996,531 B1 * | 3/2015 | Sacco | ............... | G06F 17/30336 707/741 |
| 2003/0163469 A1 * | 8/2003 | Garth | ................ | G06F 17/30286 |
| 2006/0173922 A1 * | 8/2006 | Banzon | ............. | G06F 17/30339 |
| 2006/0173938 A1 * | 8/2006 | Banzon | ................. | G06F 9/5066 |
| 2012/0078951 A1 * | 3/2012 | Hsu | .................... | G06F 17/30516 707/769 |
| 2012/0331278 A1 | 12/2012 | Breternitz et al. | | |
| 2013/0346425 A1 * | 12/2013 | Bruestle | ............ | G06F 17/30345 707/752 |
| 2015/0113535 A1 * | 4/2015 | Goda | ...................... | G06F 9/466 718/101 |

\* cited by examiner

*Primary Examiner* — Sheree N Brown
(74) *Attorney, Agent, or Firm* — Shumaker & Sieffert, P.A.

(57) ABSTRACT

Techniques are described for assigning collections of records to parallel processing tasks for sorting index keys of the records. In one example, a method includes determining an order of the collections of records in a descending order by byte length of an index key of each of the collections of records. The method further includes modifying the order of the collections of records in a descending order, for collections of records with index keys of equal byte length, by number of records per collection of each of the collections of records with index keys of same byte length. The method further includes assigning the collections of records to a plurality of parallel processing tasks in the order of the collections of records. The method may combine low elapsed processing times by balancing the amount of work in each assigned processing task with reduced computing resource overhead for each processing task.

16 Claims, 7 Drawing Sheets

| Collection | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| LngRecIndex | 80 | 60 | 50 | 50 | 40 | 40 | 30 | 20 | 18 | 16 | 15 | 12 | 10 | 8 |
| RecCount | 100 | 100 | 100 | 100 | 100 | 100 | 100 | 100 | 100 | 100 | 100 | 100 | 100 | 100 |

| Sort Task | 1 | 2 | 3 | 4 | 5 | 6 |
|---|---|---|---|---|---|---|
| LngRecIndex | 80 | 50 | 40 | 30 | 16 | 12 |
| RecCount | 200 | 200 | 200 | 300 | 200 | 300 |
| TotalRecs | 200 | 400 | 600 | 900 | 1100 | 1400 |
| AvgRecs | 233 | 466 | 699 | 932 | 1165 | 1398 |

FIG. 6

SORTING DATABASE COLLECTIONS FOR PARALLEL PROCESSING

TECHNICAL FIELD

This disclosure relates to data systems, and more particularly, to database server systems.

BACKGROUND

Enterprises that process large amounts of data typically rely on database systems. An enterprise database system may include a database for storing the enterprise's data, and may also include a database management system for processing, managing, and delivering the enterprise's data. The database management system may include database tools for performing tasks with the database. For example, a database may include a database index with index keys to facilitate accessing the data.

In some database systems, the database management system may access an index key for each of the data records, and sort the index keys for the records for storage in the index. The database tools may include a tool for bulk processing of the index keys. The data records may be added and stored to the database in an arbitrary order, while the database management system may sort the index keys to the records in the index, and rely on the sorted index to locate the records as needed.

SUMMARY

In general, examples disclosed herein are directed to techniques for assigning collections of records in a database to parallel processing tasks for sorting index keys of the records for a database index, with potentially high performance in terms of both low elapsed time and efficient use of computing resources, thereby reducing computing resource overhead.

In one example, a method for assigning collections of records to parallel processing tasks for sorting index keys of the records includes determining, by a computing device, an order of collections of records based on a length of an index key for each of the collections of records. The method further includes, for subsets of the collections of records identified as having index keys of equal length, modifying, by the computing device, the order of the collections of records within the identified subsets based on a number of records per collection. The method further includes assigning, by the computing device, the collections of records to a plurality of parallel processing tasks based on the order of the collections of records.

In another example, a computer program product for assigning collections of records to parallel processing tasks for sorting index keys of the records includes a computer-readable storage medium having program code embodied therewith. The program code is executable by a computing device to determine an order of collections of records in a descending order by length of an index key for each of the collections of records. The program code is further executable by a computing device to, for subsets of the collections of records identified as having index keys of equal length, modify the order of the collections of records within the identified subsets based on a number of records per collection. The program code is further executable by a computing device to assign the collections of records to a plurality of parallel processing tasks based on the order of the collections of records.

In another example, a computer system for assigning collections of records to parallel processing tasks for sorting index keys of the records includes one or more processors, one or more computer-readable memories, and one or more computer-readable, tangible storage devices. The computer system further includes program instructions, stored on at least one of the one or more storage devices for execution by at least one of the one or more processors via at least one of the one or more memories, to determine an order of collections of records in a descending order by length of an index key for each of the collections of records. The computer system further includes program instructions, stored on at least one of the one or more storage devices for execution by at least one of the one or more processors via at least one of the one or more memories, to, for subsets of the collections of records identified as having index keys of equal length, modify the order of the collections of records within the identified subsets based on a number of records per collection. The computer system further includes program instructions, stored on at least one of the one or more storage devices for execution by at least one of the one or more processors via at least one of the one or more memories, to assign the collections of records to a plurality of parallel processing tasks based on the order of the collections of records.

The details of one or more embodiments of the disclosure are set forth in the accompanying drawings and the description below. Other features, objects, and advantages of the disclosure will be apparent from the description and drawings, and from the claims.

BRIEF DESCRIPTION OF DRAWINGS

FIG. 6 is a diagram of a chart of assignments of index collections of records to parallel processing tasks of central processing units (CPU's) by an indexing management tool, in an example where the number of collections to be sorted outnumbers the available parallel processing sort tasks available for scheduling on CPU's, in accordance with one example.

DETAILED DESCRIPTION

Various examples are disclosed herein for assigning collections of records in a database to parallel processing tasks for sorting index keys of the records for a database index, in a way that may provide high performance in terms of both low elapsed time and efficient use of computing resources, thereby reducing computing resource overhead. In some examples, an indexing management tool of this disclosure, acting as part of a database management system, may assign sets of data records to index sort parallel processing tasks based on determinations of how to reduce both total elapsed time and computing resource overhead for parallel index sort processing tasks, as further described below.

Figure 1:
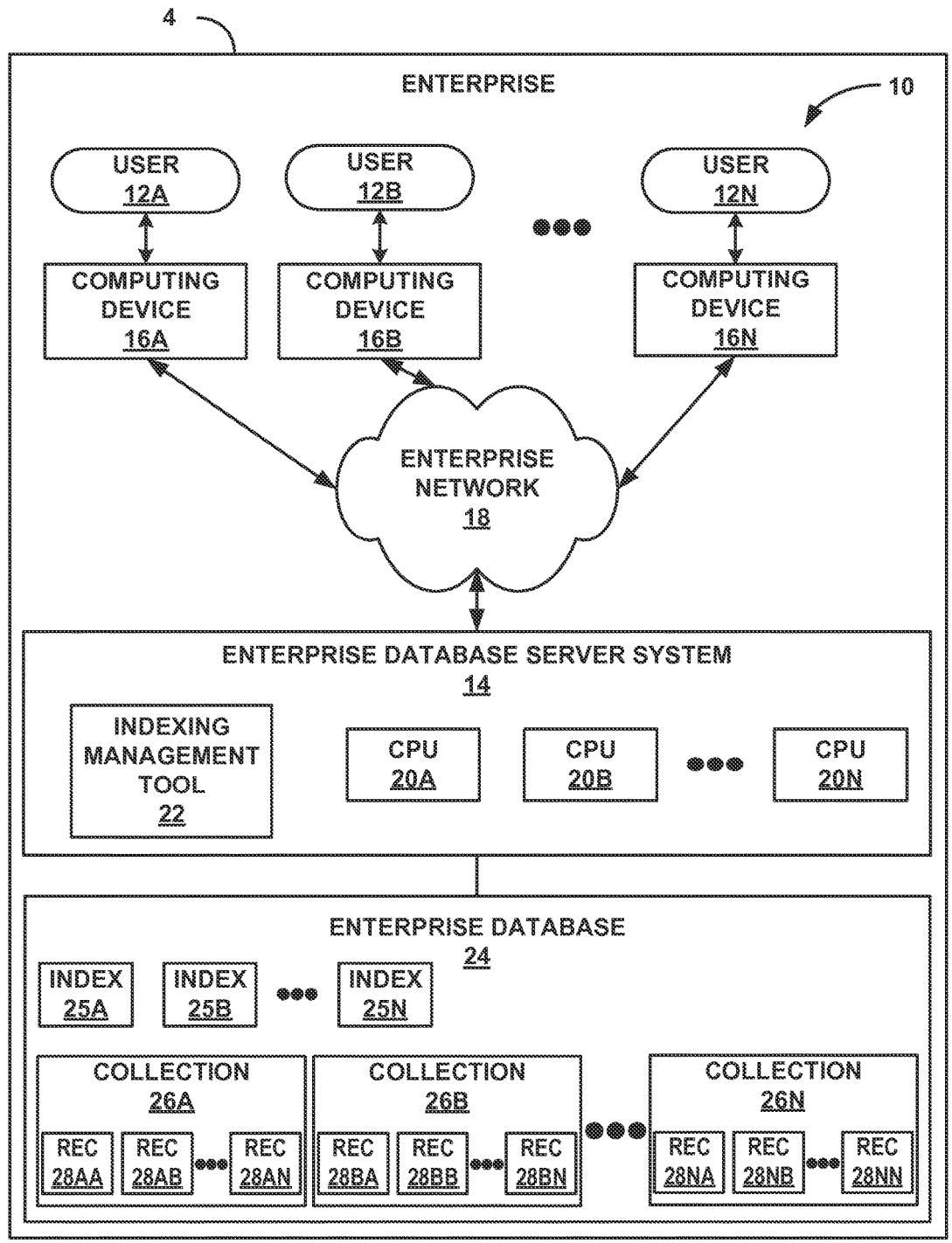
FIG. 1 is a block diagram illustrating an example enterprise having a computing environment in which users interact with an enterprise database server system and database, in accordance with one example.

FIG. 1 is a block diagram illustrating an example enterprise 4 having a computing environment 10 in which a plurality of users 12A-12N (collectively, "users 12") may interact with an enterprise database server system 14 and an enterprise database 24, in accordance with one example. Enterprise database server system 14 may be a relational database management system (RDBMS), for example. In the system shown in FIG. 1, enterprise database server system 14 is communicatively coupled to a number of client computing devices 16A-16N (collectively, "client computing devices 16" or "computing devices 16") by an enterprise network 18. Users 12 interact with their respective computing devices to access enterprise database server system 14. Users 12, computing devices 16A-16N, enterprise network 18, enterprise database server system 14, and enterprise database 24 may all be implemented in a single facility or in widely dispersed in two or more separate locations anywhere in the world, in different examples.

For exemplary purposes, various examples of the techniques of this disclosure may be readily applied to various software systems, including enterprise database server systems or other large-scale enterprise software systems. Examples of enterprise database server systems include enterprise financial or budget planning systems, order management systems, inventory management systems, sales force management systems, banking or financial management systems, database server tools, project and resource management systems, and other enterprise software systems.

Enterprise network 18 may represent any communication network, and may include a packet-based digital network such as a private enterprise intranet or a public network like the Internet. In this manner, computing environment 10 can readily scale to suit large enterprises. Enterprise users 12 may directly access enterprise database server system 14 via a local area network, or may remotely access enterprise database server system 14 via a virtual private network, remote dial-up, or similar remote access communication mechanism.

In this example, enterprise database 24 may include collections of data records (e.g., rows) 26A-26N (collectively, "collections 26"), where each collection among collections 26A-26N may include a number of records, e.g., collection 26A contains records 28AA-28AN, collection 28N contains records 28NA-28NN, etc. (collectively, "records 28"), and each collection 26 is to be sort processed for inclusion in an index 25. Each of records 28 may be of a different length, and each collection 26 may contain different numbers of records 28. In this example, enterprise database server system 14 includes servers and/or mainframe hardware that include central processing units (CPU's) 20A-20N (collectively, "CPU's 20"). Enterprise database server system 14 may include other types of processing units or processing cores, which may be considered in common with CPU's 20 for purposes of this disclosure. Enterprise database server system 14 may run data processing applications, including intensive data processing tasks, on collections 26 in enterprise database 24.

Enterprise database server system 14 also includes indexing management tool 22. Indexing management tool 22 may include executable instructions, in the form of one or more applications, modules, libraries, or other portions of code, for assigning collections 26 and records 28 to sort processing tasks for parallel processing by CPU's 20. Indexing management tool 22 may be included in a set of utilities incorporated in enterprise database server system 14. Indexing management tool 22 may also be implemented in an infrastructure component or a services component of enterprise database server system 14, for example.

Indexing management tool 22 may include executable instructions that implement or embody techniques or methods for improving the efficiency and performance of assigning index keys of collections 26 to parallel processing tasks of CPU's 20 to sort the index keys for database indexes 25A-25N (collectively, "indexes 25") for enterprise database 24, in view of the different numbers of records 28 per collection 26, the different byte length of the index keys for records 28, and constraints on the available number of CPU's 20. The improvements in efficiency and performance of the sorting of collections 26 for parallel processing by CPU's 20 enabled by data sorting tool 22 may be measured in reduced time and/or reduced CPU cycles for CPU's 20 to complete a set of parallel processing tasks, for example. Example methods and techniques that data sorting tool 22 may perform or implement are further described below.

In various examples, enterprise database server system 14 may have many available CPU's 20 that may each be able to execute a processing task, such as an index sort processing task, in parallel. Enterprise database 24 may have a large number (e.g., thousands, millions, or more) of records 28, and may have several indexes 25 that each include respective index keys from records 28. Each index 25 may include index keys that refer to one or more particular columns from collections 26 that contain records 28. Enterprise database server system 14 may have system utilities that include indexing management tool 22 that manages the sort processing of the index keys from records 28 for one or more of the database indexes 25. Records 28 may be scattered in enterprise database 24 in any order, while enterprise database server system 14 may track the location or address of records 28 via multiple indexes 25, by sorting index keys (one or more index keys per index) from records 28 and maintaining the index keys for each index 25 in a sorted order in each index 25.

It may often be desired to perform sort processing of large numbers of records 28 for sorting multiple index keys among records 28 for inclusion in one or multiple indexes 25 in database 24. Processing records 28 for inclusion in an index 25 may be performed in collections 26 of records 28, with each collection 26 of records 28 being processed for one index 25. Processing a collection 26 of records 28 for an index 25 may be referred to simply as processing an index, and sort processing large numbers of records 28 from one or more collections 26 for one or multiple indexes 25 may be referred to as sort processing, processing, or sorting multiples indexes 25 (where a collection 26 of records 28 is targeted to a particular index 25). One collection 26 may include thousands, millions, or any number of records 28 being sort processed at one time for particular index keys being included in one of indexes 25.

Multiple collections 26 of records 28, targeting multiple indexes 25 (one collection 26 to one index 25), may be processed within one invocation of indexing management tool 22. In this case, performance may typically be improved when each of the collections 26 is sorted in its own sort processing task, and the sort processing tasks are all run in parallel, e.g., each processing task is executed on a separate CPU 20 among the several CPU's 20 available in database server system 14. In particular, the collections 26 may be different sources for the index keys, where a single table space may contain multiple tables and each table may have an arbitrary number of indexes. In this case, the collections 26 may describe the selected columns of a table's row that make up an index 25 over all the records 28. The index keys may also be created at once while processing the rows of one or more tables a single time while reading through a single table space. If a table has more than one index defined, then each row will create an index key for each index of the table. Sort processing all the index keys for the collections 26 for the indexes 25 at the same time may therefore enable avoiding reading through all of the data over and over again for each index 25, and may therefore contribute substantially to reducing processing time and computing resource overhead in indexing the data.

In some cases, the available parallel sort processing tasks (e.g., with one available sort processing task per available CPU 20) may be outnumbered by the collections 26 to be processed. In this case, indexing management tool 22 may assign multiple collections 26 to each of one or more of the available sort processing tasks, such that multiple collections 26 are to be processed in the same sort processing task (and by the same CPU 20).

The different collections 26 often also have different index key byte lengths. The index key may be determined with reference to one or more columns in a collection. Each column may be defined to have a particular data type, such as integer, big integer, character, etc., and each data type may be defined to have a particular length. The index key length may be considered in terms of an index key byte length in some examples, though the index key length may also be measured in other terms in other examples. The index key may then have its byte length defined as the byte length of a single column to which it refers, or the sum of the byte lengths of multiple columns to which it refers, in different examples. The index key byte length may be, e.g., 8 bytes, 10 bytes, 16 bytes, 80 bytes, or some other value. The index key may need to refer to one or more particular columns and its length may need to vary in this way depending on the type of application that uses the particular index 25 and how that application accesses the data through that particular index 25.

Each processing task typically processes index keys of a fixed byte length. When multiple collections 26 are assigned to be sort processed in the same processing task, but the collections 26 (and their target indexes 25) have different index key byte lengths, the collection 26 with the shorter index key byte length typically has its index keys padded to fill the additional space between its own shorter index key byte length and the longer index key byte length of the collection 26 with the longest index key byte length in the same processing task. This padding may be considered filler data that does not encode information, and is simply created and then discarded for purposes of maintaining byte length alignment among different collections 26 in the same processing task. This padding creates extra computing resource overhead, in terms of working memory, disk space, and/or CPU cycles of enterprise database server system 14 devoted to storing and/or processing the meaningless padding data. Enterprise database server system 14 may typically have many other tasks to perform that the sort processing may compete with for computing resources, so it is desirable to reduce extra computing resource overhead devoted to padding.

Index sort processing management tool 22 may reduce the computing resource overhead in processing multiple collections 26 per parallel processing task by assigning collections 26 with index key byte lengths that are equal or as similar as possible to each other to the same parallel processing task. However, each collection 26 may include a different number of records 28 without relation to the index key byte length of the collection 26 (e.g., of the index 25 targeted by the collection 26). For example, one collection to be sort processed may include one million records 28, while another collection to be sort processed may include four million records 28. The required elapsed time for processing each collection 26 may typically be largely proportional to the number of records 28 to be processed in the collection 26.

It is often desirable to reduce the total required elapsed time to perform index sort processing on all the records in a parallel processing batch of collections 26, where a parallel processing batch may be understood to be a whole set of collections 26 to be sort processed in parallel in simultaneous parallel processing tasks by CPU's 20. When multiple collections 26 are assigned to each parallel processing task, the total required elapsed time to perform index sort processing on the whole batch is typically set by the total required elapsed time to perform index sort processing on the parallel processing task with the highest sum of records in the collections 26 assigned to it. It may therefore also be desirable to match the total number of records 28 to be processed in each parallel processing task as evenly as possible, to reduce the total elapsed time of the processing batch.

The total number of records 28 in a parallel processing task is typically unrelated to the index key byte length of the collections 26 that include the records (and the index 25 targeted for the collection 26). Thus, reducing total required elapsed time for performing the sort processing of a batch of collections 26, and reducing total computing resource overhead (e.g., in terms of memory, disk space, CPU cycles) for performing the sort processing of the batch of collections 26, are two important but unrelated performance criteria. It has typically been unclear how to optimize among both of these unrelated performance goals at the same time.

In accordance with various examples of this disclosure, indexing management tool 22 may govern the assignment of collections 26 in a batch to parallel processing tasks in a way that combines good performance in terms of both of these performance goals, by providing both low total elapsed time and low computing resource overhead for processing the collections 26. Examples of indexing management tool 22 providing both of these performance goals at the same time are further described below.

Figure 2:
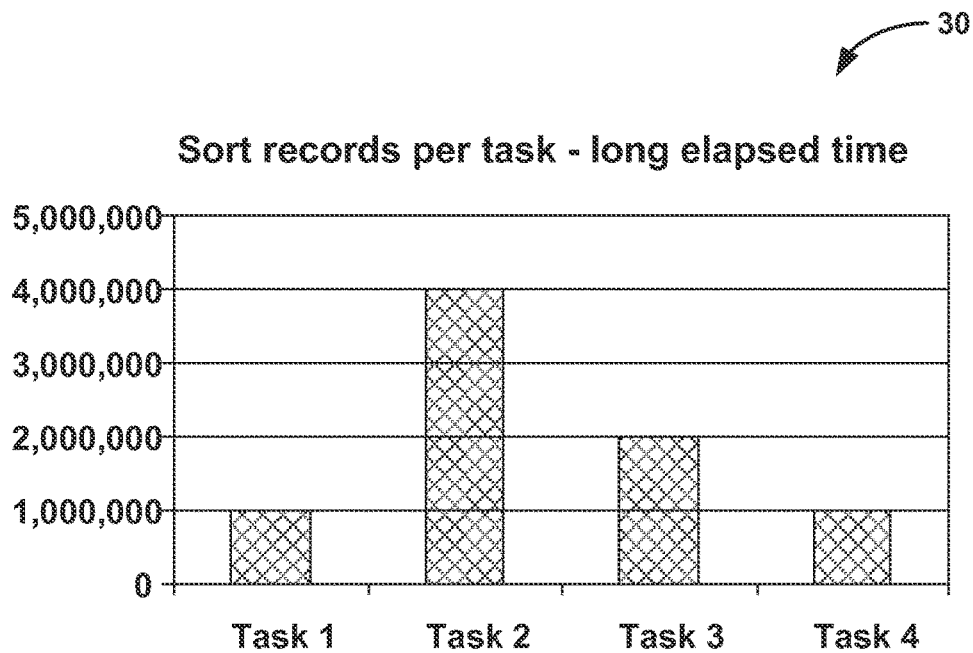
FIG. 2 is a diagram of a chart depicting elapsed time for sort processing collections of records in parallel processing tasks, in accordance with one example.
Figure 3:
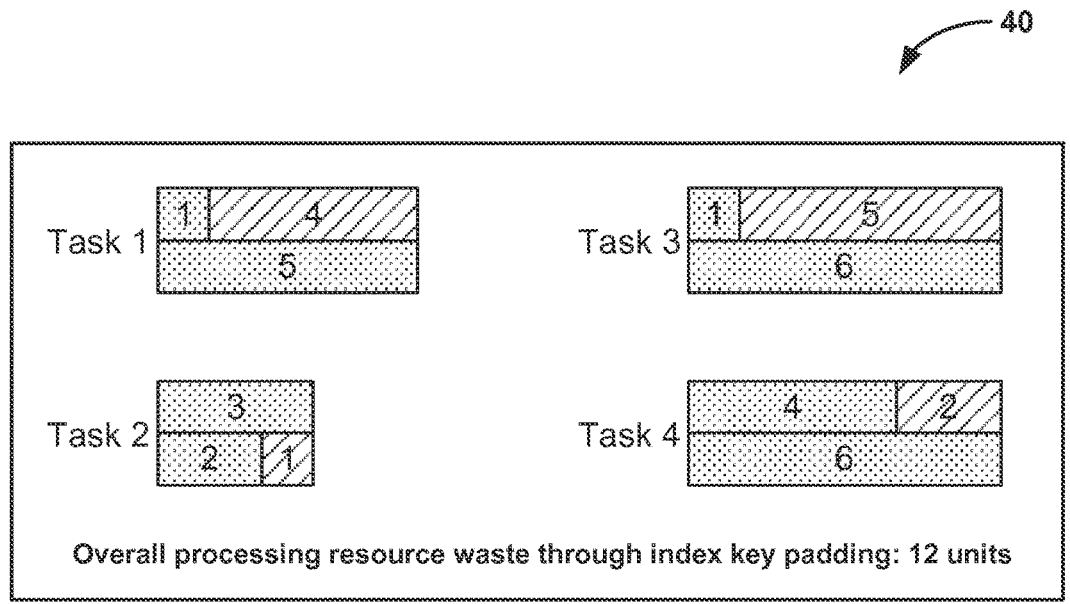
FIG. 3 is a diagram of a chart depicting index key byte length in terms of arbitrary units for collections of records assigned to parallel processing tasks, in accordance with one example.

FIG. 2 shows a chart 30 depicting elapsed time for sort processing collections 26 of records in four parallel processing tasks, in a processing batch that may not yet be assigned for pursuing the performance goal of reducing total elapsed time required for processing, in accordance with one example. FIG. 3 shows a chart 40 depicting index key byte length in terms of arbitrary units (one unit may be, e.g., two bytes or four bytes) for eight collections 26 assigned two each to four parallel processing tasks, in which each parallel processing task has two collections 26 of different index key byte length, one of which has index key padding added to align the index key byte length of the collections 26 in each processing task, also in a processing batch that is not assigned well for meeting the performance goal of reducing padding and computing resource overhead, in accordance with one example. FIGS. 2 and 3 thus graphically demonstrate two examples of potentially poor performance in both relevant performance criteria described above when collections 26 are assigned to parallel processing tasks in a way that does not optimize for these two performance criteria. FIGS. 2 and 3 may reflect the performance of collection assignments to parallel processing tasks before being assigned in an optimized manner by indexing management tool 22 of this disclosure. FIGS. 2 and 3 may each depict different performance shortcomings for different techniques for assignments in the same processing batch, such that the collections 26 assigned to processing tasks 1-4 shown in chart 30 are the same as the collections 26 assigned to processing tasks 1-4 shown in chart 40, but assigned in pursuit of two different, unrelated performance goals.

As FIG. 2 shows, processing tasks 1 and 4 each include one million records, while task 3 includes two million records and task 2 includes four million records. Task 2 may therefore be expected to take approximately four times as much time to complete as tasks 1 and 4. As FIG. 3 shows, each of the four tasks requires one collection 26 to have padding added. Task 3 includes the most padding, and therefore the highest amount of wasted computing resource overhead (e.g., overhead of reserved memory, disk space, and/or CPU cycles), with five units of padding added to one collection 26 with an index key length of only one unit, to match the index key length of six unites of the other collection 26 assigned to parallel processing task 3. Four example, one unit may be four bytes, the two collections 26 assigned to parallel processing task 3 may have index key byte lengths of four bytes and 24 bytes, respectively, and 20 bytes of padding may be added to the index keys of each record in the first collection 26 assigned to the task. This may result in additional computing resource overhead in terms of the memory, disk space, and/or CPU cycles devoted to handling or processing the 20 bytes of padding for the index keys of each of a potentially large number of records, such as for each of millions of records.

As the collections 26 are assigned as shown in FIG. 3, processing task 1 requires a padding of four units, processing task 4 requires a padding of two units, and processing task 2 requires a padding of one unit, resulting in total padding of twelve units for the four processing tasks. In the example where each unit equals four bytes, this means 48 bytes of waste over the four tasks.

In some cases, the collection assignments may be made to reduce the addition of padding, without considering the number of records per collection. In one example, five collections may be assigned to two parallel processing tasks, where the collections have index byte lengths of 16, 20, 20, 24, and 80 bytes, respectively, and each contain one million records. An indexing management tool optimizing only to reduce padding may assign the first four collections to the first parallel processing task and the fifth collection by itself to the second parallel processing task. Assigning the collections in this way results in the first parallel processing task having an index byte length of 24 bytes to match that of the largest index byte length among the first four collections, with 8, 4, and 4 bytes of padding applied to the other three collections in the processing task. The 80 byte length of the fifth index key applies to the second processing task with its lone collection, and does not use any padding. However, the elapsed time required for processing may not be ideal in this set of assignments. The first processing task is assigned to process four million records and will take about four times as long as the second processing task, which only processes one million records. The poor performance of the task assignments in these examples may be contrasted with the examples described below.

Figure 4:
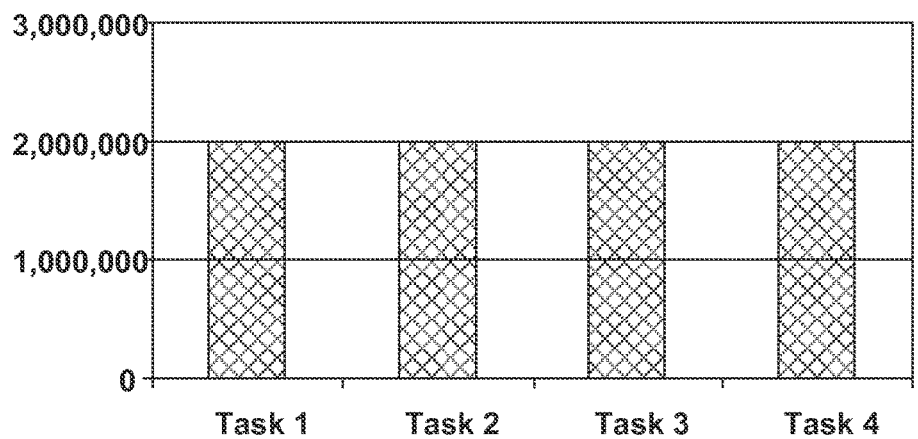
FIG. 4 is a diagram of a chart depicting elapsed time for sort processing the same collections of records as in FIG. 2 in four parallel processing tasks, in accordance with one example.
Figure 5:
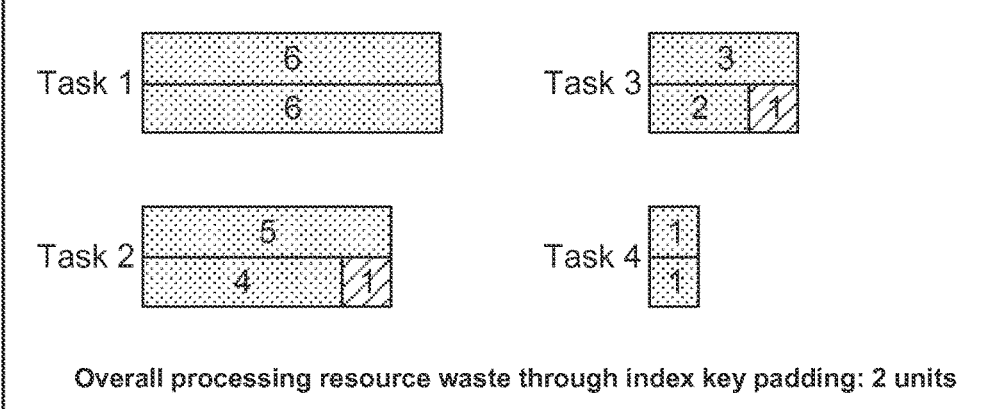
FIG. 5 is a diagram of a chart depicting index key byte length in terms of arbitrary units for the same eight collections as in FIG. 3, in accordance with one example.

FIG. 4 shows a chart 50 depicting elapsed time for sort processing the same in collections of records as in FIG. 2 in four parallel processing tasks, in a processing batch that has been assigned by indexing management tool 22 of this disclosure in accordance with the performance goal of reducing total elapsed time for processing, in accordance with one example. As shown in the example of FIG. 4, the eight million records to be processed in the collection are distributed evenly into groups of two million records in each of four million parallel processing tasks, so that the total elapsed time required to sort process the records is reduced as much as possible. FIG. 5 shows a chart 60 depicting index key byte length in terms of arbitrary units (one unit may be, e.g., four bytes) for the same eight collections as in FIG. 3, assigned two each to four parallel processing tasks, also in a processing batch that has been assigned by indexing management tool 22 of this disclosure in accordance with the performance goal of reducing padding and efficient use of computing resources, thereby reducing computing resource overhead, in accordance with one example. FIGS. 4 and 5 may both depict performance improvements for the same processing batch, such that the collections assigned to processing tasks 1-4 shown in chart 50 are the same as the collections assigned to processing tasks 1-4 shown in chart 60.

In the example of chart 60, indexing management tool 22 has assigned the eight collections to the four available parallel processing tasks in a way that may reduce padding. Given the same eight collections as shown in FIG. 3, with index byte lengths of 6, 6, 5, 4, 3, 2, 1, and 1 units, indexing management tool 22 has assigned the eight collections to the four available parallel processing tasks in a way that uses only two units of padding in the example of FIG. 5, instead of the twelve units of padding in the example of FIG. 3, thereby reducing padding and computing resource overhead by approximately 83%. Indexing management tool 22 has assigned collections with the same index byte length to the same parallel processing task, where possible (tasks 1 and 4), and assigned collections with different index byte lengths with as little difference as possible between the index byte lengths in the same task (tasks 2 and 3). FIGS. 4 and 5 thus graphically demonstrate an example of improved performance in both relevant performance criteria of reduced elapsed time required and reduced computing resource overhead (e.g., reduced memory, disk space, CPU cycles) when collections are assigned to parallel processing tasks in a way that improves performance for these two performance criteria.

FIG. 6 depicts a chart 120 of assignments 128 of index collections 26 (or "collections 26") of records 28 to parallel processing tasks of CPU's 20 by an indexing management tool 22 (making reference to features as depicted in enterprise database server system 14 and enterprise database 24 shown in FIG. 1), in an example where the number of collections 122 to be sorted outnumbers the available parallel processing sort tasks 130 available for scheduling on CPU's 20, in accordance with one example. Chart 120 depicts a batch 122 of fourteen collections 26 (referenced in line 122) to be sort processed, the collections labeled 1-14 in line 122. The byte length of the index key of the records 28 in each collection (labeled "LngRecIndex") is depicted in line 124 for the corresponding collection 26 indicated in line 122, such that collection 1 has an index key byte length of 80, collection 2 has an index key byte length of 60, and so on to collection 14 which has an index key byte length of 8.

Line 126 indicates the number of records (labeled "Rec-Count"), in millions of records, in each of collections 1-14. As shown in line 126, each of the fourteen collections has a record count of one hundred million records, in this example, while in some examples, the number of records may be different between two or more of the collections, up to between all of the collections. Line 130 shows the six available parallel processing tasks on CPU's 20 for sort processing the fourteen collections indicated in line 122.

Given the fourteen collections 122 to be processed in the six available parallel processing tasks 130, indexing management tool 22 may assign collections 122 to parallel processing tasks 130 for sorting index keys of the records in a manner that provides good performance in terms of both low elapsed time required and low waste of computing resource overhead, as described as follows. Indexing management tool 22 may determine an order of the collections 122 of records in a descending order by index key byte length (or byte length of an index key) of each of the collections 122 of records. Chart 120 shows collections 122 already arranged in this order as determined by indexing management tool 22, such that collections 1-14 are lined up in an order with their index key byte length 124 (labeled "LngRecIndex") in descending order from largest to smallest, or from 80, 60, 50, etc. down to 8 bytes in length.

Indexing management tool 22 may then determine whether any collections 122 have the same index key byte length and have different numbers of records per collection. If there are, indexing management tool 22 may identify those as subsets of collections having the same index key byte length and have different numbers of records per collection. Indexing management tool 22 may modify the order of the collections 122 of records in a descending order, for each of those subsets of collections of records with index keys of equal byte length, by the number of records per collection of each of the collections of records with index keys of same byte length.

In the example of FIG. 6, indexing management tool 22 may determine that there are some collections with the same value of index key byte length. Collections 3 and 4 each have an index key byte length of 50, and collections 5 and 6 each have an index key byte length of 40. If either of these sets of collections had an unequal number of records, as shown in line 126, indexing management tool 22 would modify the order of collections as needed for each of these sets of collections with equal index key byte length to be ordered in descending order of number of records (or record count). In the example of FIG. 6, each of these pairs of collections has an equal number of records, so indexing management tool 22 may leave the order of collections 122 without further modification.

Indexing management tool 22 may then assign the collections 122 of records to a plurality of parallel processing tasks 130 (labeled "sort tasks" in FIG. 6) in the order of the collections of records, as indexing management tool 22 has determined and potentially further modified the order as described above (with assignments of collections to sort tasks as indicated at 128). Indexing management tool 22 may further use techniques to determine which collections 122 to assign to which parallel processing sort tasks 130 in a way that promotes high performance in terms of low elapsed time required and low computing resource overhead.

In particular, in this example, indexing management tool 22 may assign the collections 122 of records to the plurality of parallel processing tasks 130 in a way that includes determining an accumulated total number of the records (e.g., the records 126 included in collections 122) assigned to a particular parallel processing task 130, determining an accumulated average number of the records assigned to the particular parallel processing task 130, and assigning an initial portion of the collections 122 of records to the particular parallel processing task 130 in the order of the collections of records while the accumulated total number of the records assigned to the particular parallel processing task 130 is less than the accumulated average number of records assigned to the particular parallel processing task 130. Indexing management tool 22 may determine an accumulated total number of the records as the total number of records accumulated in a current parallel processing task as it assigns collections to that parallel processing task. Similarly, indexing management tool 22 may determine an accumulated average number of the records as the total number of records accumulated in a current processing task and previously addressed processing tasks as it assigns collections to that current parallel processing task. The current parallel processing task may be the parallel processing task currently being addressed by indexing management tool 22.

The parallel processing task currently being addressed by indexing management tool 22 may be the parallel processing task to which indexing management tool 22 is currently assigning a collection or is considering as a candidate processing task for assigning a collection to. The accumulated average number of records may be considered a theoretical or ideal number of records that would be assigned to the current processing task and all previously addressed processing tasks if the records were to be divided perfectly evenly among the processing tasks, without regard for the records being contained in groups in the collections, and being assigned in groups lumped together within collections to the processing tasks. Indexing management tool 22 may calculate this theoretical average accumulated number of records iteratively as indexing management tool 22 considers processing tasks for assigning collections to, and as indexing management tool 22 assigns the collections to the processing tasks.

For example, indexing management tool 22 may implement the following algorithm. Indexing management tool 22 may determine and store a total for the number of records over all index collections 122 (i.e., collections 122) (stored in a variable named, e.g., TotalIndexRecords). Indexing management tool 22 may then determine the average number of records per sort task (e.g., as a variable AvgRecords=TotalIndexRecords/SortTasks). Indexing management tool 22 may then clear the total number of records assigned (e.g., resetting the total number of records assigned variable to 0, TotalRecordsAssigned=0).

Indexing management tool 22 may then evaluate the sorted index collection 122 entries, starting with entry 1 which would have the largest index key byte length in the determined order, as shown in line 122 in chart 120. Indexing management tool 22 may also start with parallel processing sort task 1 (as shown in line 130 in chart 120) as the current target for assignment (CurrentSortTask).

Indexing management tool 22 may then assign the current index collection 122 to the current sort task 130, and correspondingly increase the variable TotalRecordsAssigned by the number of records for the current index collection 122. Indexing management tool 22 may then calculate the average number of records for the current number of sort tasks processed (e.g., as TotalAverageRecords=CurrentSortTask*AvgRecords). Indexing management tool 22 may then advance to the next index entry as CurrentIndex.

If the total records assigned to a processing sort task 130 (e.g., TotalRecordsAssigned+the number of records for CurrentIndex) is less than the total average records (e.g., TotalAverageRecords), then indexing management tool 22 may repeat the steps of assigning the current index collection 122 to the current sort task 130, correspondingly increasing the variable TotalRecordsAssigned by the number of records for the current index collection 122, and calculating the average number of records for the current number of sort tasks processed. Indexing management tool 22 may then advance to the next index collection 122 entry as CurrentIndex, as described above. Otherwise, when the total records assigned to a processing sort task 130 (e.g., TotalRecordsAssigned+ the number of records for CurrentIndex) is less than the total average records (e.g., TotalAverageRecords), then indexing management tool 22 may advance to the next parallel processing sort task 130 (e.g., CurrentSortTask=CurrentSortTask+1). If the current sort task 130 (e.g., CurrentSortTask) is less than or equal to the total number of sort tasks 130 (e.g., SortTasks), then indexing management tool 22 may again repeat the steps of assigning the current index collection 122 to the current sort task 130, correspondingly increasing the variable TotalRecordsAssigned by the number of records for the current index collection 122, and calculating the average number of records for the current number of sort tasks processed, as described above.

In this manner, indexing management tool 22 may ensure that the accumulated number of records in all parallel processing tasks 130 so far, at each assignment (e.g., TotalRecs as in line 136 in FIG. 6), is less than the accumulated number of average records for the number of parallel processing tasks at that point (e.g., AvgRecs as in line 138 in FIG. 6), as further demonstrated in FIG. 7 and described below. This may provide a particular example technique for assigning the index collections 122 to the parallel processing sort tasks in a manner that reduces both computing resource overhead and elapsed time required for processing.

In particular, as shown in FIG. 6, as a result of indexing management tool 22 executing the techniques described above, index collections 1 and 2 are assigned to parallel processing sort task 1; index collections 3 and 4 are assigned to parallel processing sort task 2; index collections 5 and 6 are assigned to parallel processing sort task 3; index collections 7-9 are assigned to parallel processing sort task 4; index collections 10 and 11 are assigned to parallel processing sort task 5; and index collections 12-14 are assigned to parallel processing sort task 6.

The index key byte length of each of the parallel processing sort tasks 130 to cover their respective groups of index collections 130 is shown in line 132 ("LngRecIndex"). Sort task 1 has an index key byte length of 80 to match that of collection 1, so that collection 2 requires 20 bytes of padding. Sort task 2 has an index key byte length of 50 to match that of both collections 3 and 4, so that sort task 2 does not require any padding for any index collection. Sort task 3 has an index key byte length of 40 to match that of both collections 5 and 6, so that sort task 3 also does not require any padding for any index collection. Sort task 4 has an index key byte length of 30 to match that of collection 7, so that collection 8 requires 10 bytes of padding and collection 9 requires 12 bytes of padding. Sort task 5 has an index key byte length of 16 to match that of collection 10, so that collection 11 requires 1 byte of padding. Sort task 6 has an index key byte length of 12 to match that of collection 12, so that collections 13 and 14 require 2 and 4 bytes of padding, respectively.

This order of assignments to provide for reduced padding is combined with all of the sort tasks having either 200 million or 300 million records assigned to them, as shown in line 134 ("RecCount"). With 14 index collections each of 100 million records assigned to six parallel processing sort tasks, this may provide the most even distribution possible of index collections 122 to sort tasks 130. Indexing management tool 22 has therefore assigned the index collections 122 to sort tasks 130 in a way that may provide good performance both in low elapsed time required (as determined by highest number of index collections in any one sort task) and reduced computing resource overhead (as determined by total padding applied to index collections to fit the sort tasks to which they are assigned).

Figure 7:
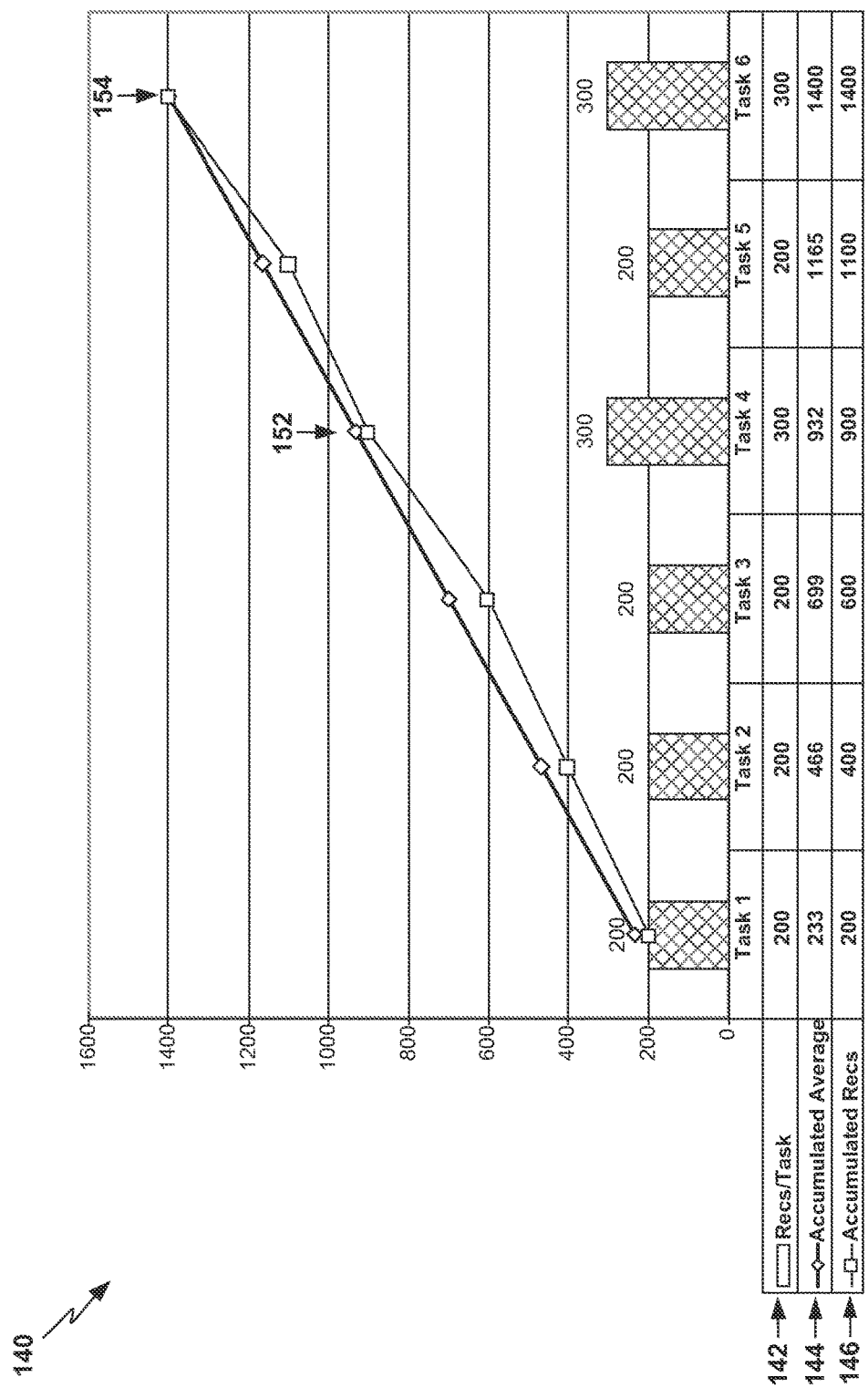
FIG. 7 shows a graph of total records per task, an accumulated average of records, and an accumulated number of records, in accordance with one example.

FIG. 7 shows a graph 140 of total records per task (142), accumulated average of records assigned to parallel processing sort tasks 130 so far at each assignment of an index collection to a sort task by indexing management tool 22 (144), and accumulated number of records in all parallel processing sort tasks 130 so far at each assignment of an index collection to a sort task by indexing management tool 22 (146), in accordance with one example. Because the total number of index collections to assign (14) is not an integer multiple of the number of available parallel processing sort tasks (6), the accumulated average runs ahead of the accumulated total number of assigned collections, until the point at which indexing management tool 22 is able to assign a higher-than-average number of index collections to one sort task. This first occurs with the assignment by indexing management tool 22 of three index collections to sort task 4, and occurs once more with the assignment of three index collections to sort task 6. As shown in FIG. 7, the accumulated number of records (146) still remains below the accumulated average number of records (144) when indexing management tool 22 assigns three index collections to sort task 4 (152), and the accumulated number of records (146) only catches up to the accumulated average number of records (144) when indexing management tool 22 assigns three index collections to sort task 6 (154).

With this method, indexing management tool 22 may ensure that the assignment of groups of index collections with an above-average number of total records in the index collection is directed to index collections with relatively lower index key byte length. Indexing management tool 22 may thereby ensure that the total padding required is relatively low, at the same time as attempting to ensure that the total elapsed time for processing is low. Examples of this method applied by indexing management tool 22 may also apply in scenarios with potentially much higher numbers of index collections and available parallel processing sort tasks (and available CPU's), and with potentially different numbers of records per index collection.

In some examples, indexing management tool 22 may therefore assign a subsequent portion of the collections of records to an additional parallel processing task among the plurality of parallel processing tasks, in the order of the collections of records, while the accumulated total number of the records assigned to the additional parallel processing task is less than the accumulated average number of records assigned to the additional parallel processing task. In some examples, indexing management tool 22 may therefore assign further portions of the collections of records to further parallel processing tasks among the plurality of parallel processing tasks, in the order of the collections of records, until each of the collections of records has been assigned to one of the parallel processing tasks.

At some points, the accumulated total number of the records assigned to an additional parallel processing task may become greater than the accumulated average number of records assigned to the additional parallel processing task. At such a point, in some examples, indexing management tool 22 may, in response, make a comparison of a computing resource overhead of assigning a subsequent collections of records from the collections of records to either the particular parallel processing task or an additional parallel processing task among the plurality of parallel processing tasks. Indexing management tool 22 may then, in this case, assign the subsequent collections of records to either the particular parallel processing task or the additional parallel processing task based on which of the parallel processing tasks has a lower computing resource overhead based on the comparison. In some examples, indexing management tool 22 may assign respective portions of the collections of records to respective parallel processing tasks in the order of the collections of records such that index key padding of unequal index keys of the collections of records in the parallel processing tasks is less than if the collections of records were assigned to the respective parallel processing tasks without the order of the collections of records.

Once indexing management tool 22 has assigned all of the index collections of records to respective parallel processing sort tasks, indexing management tool 22 may distribute or send the collections of records to a plurality of processing units (e.g., CPU's 20 of enterprise database server system 14) in accordance with the assigning of the collections of records to the plurality of parallel processing tasks in the order of the collections of records, wherein each of the processing units is available to execute a respective one of the parallel processing tasks. CPU's 20 of enterprise database server system 14 may then execute the parallel processing sort tasks on the collections of index records, and store the resulting index information to the index collections of records in the corresponding indexes to enterprise database 24, facilitating future access to the data records 28.

Figure 8:
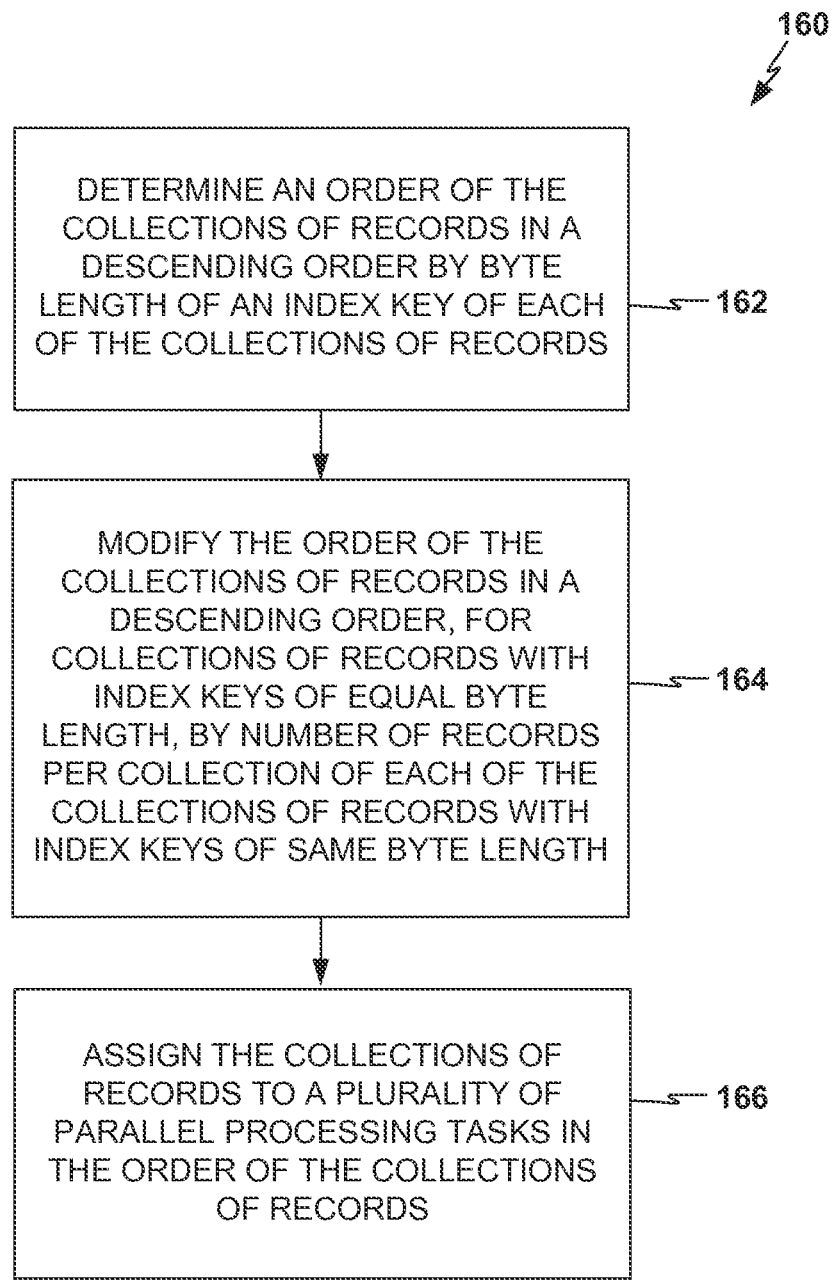
FIG. 8 is a flowchart of an example overall process that an indexing management tool, executing on one or more computing devices, may perform, in accordance with one example.

FIG. 8 shows a flowchart for an example overall process 160 that indexing management tool 22, executing on one or more computing devices (e.g., servers, computers, processors, etc. as part of enterprise database server system 14), may perform, in accordance with one example. Indexing management tool 22 may determine an order of the collections of records (e.g., collections 26 of FIG. 1) in a descending order by byte length of an index key of each of the collections of records (e.g., in the order of collections 122 of FIG. 6) (162). Indexing management tool 22 may then modify the order of the collections of records in a descending order, for collections of records with index keys of equal byte length, by number of records per collection of each of the collections of records with index keys of same byte length (e.g., as in the discussion above with reference to FIG. 6) (164). Indexing management tool 22 may then assign the collections of records to a plurality of parallel processing tasks in the order of the collections of records (e.g., assignments 128 of collections to sort tasks 130 as shown in FIG. 6) (166).

Figure 9:
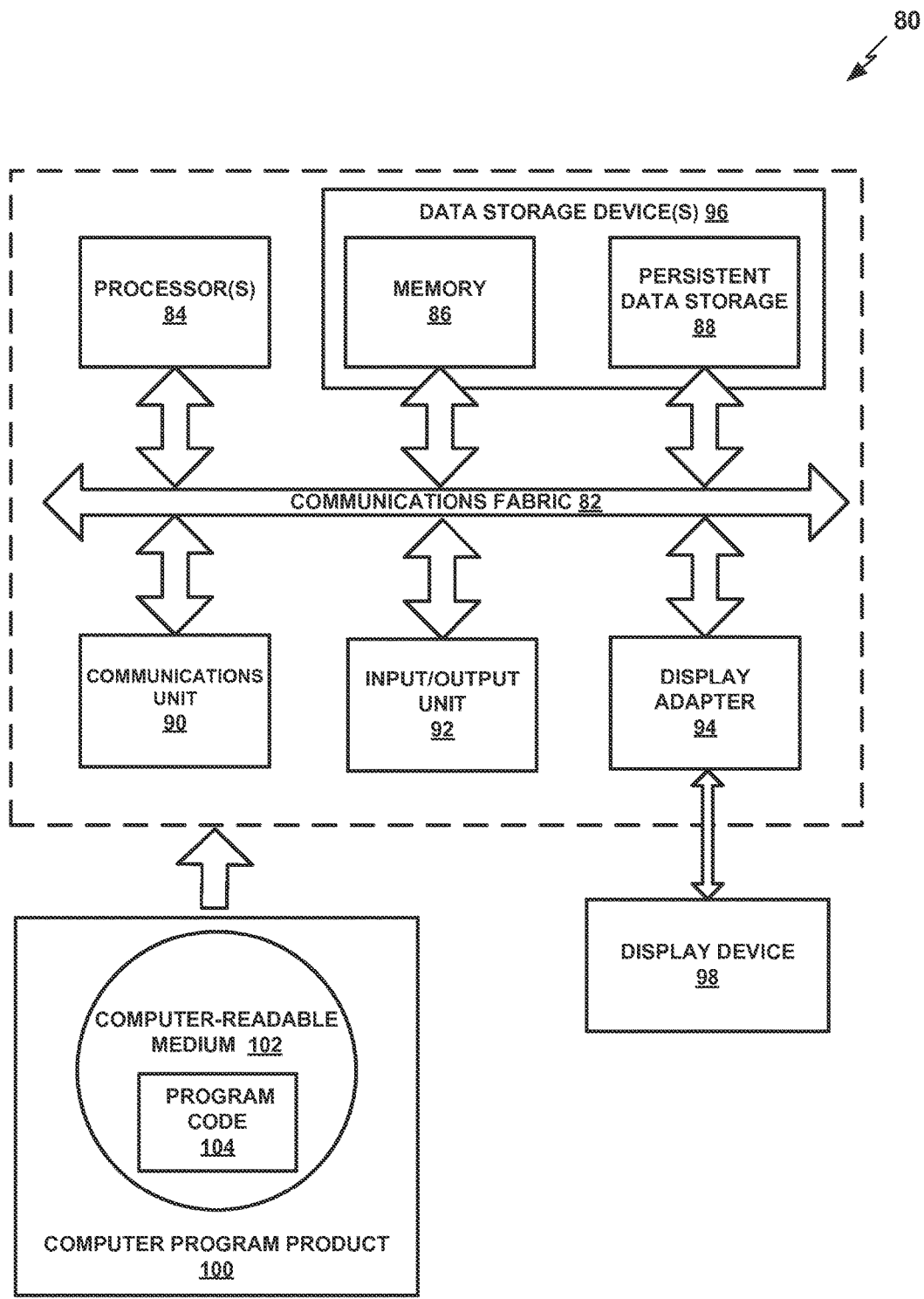
FIG. 9 is a block diagram of a computing device that may be used to execute an indexing management tool, potentially as part of enterprise database server system, according to an illustrative example.

FIG. 9 is a block diagram of a computing device 80 that may be used to execute an indexing management tool 22, potentially as part of enterprise database server system 14, according to an illustrative example. Computing device 80 may be a server such as a database server, web server, application server, etc. that may be incorporated as part of enterprise database server system 14 as depicted in FIG. 1. Computing device 80 may also be any server for providing an enterprise database server application in various examples, including a virtual server that may be run from or incorporate any number of computing devices. A computing device may operate as all or part of a real or virtual server, and may be or incorporate a workstation, server, mainframe computer, notebook or laptop computer, desktop computer, tablet, smartphone, feature phone, or other programmable data processing apparatus of any kind Other implementations of a computing device 80 may include a computer having capabilities or formats other than or beyond those described herein.

In the illustrative example of FIG. 9, computing device 80 includes communications fabric 82, which provides communications between processor unit 84, memory 86, persistent data storage 88, communications unit 90, and input/output (I/O) unit 92. Communications fabric 82 may include a dedicated system bus, a general system bus, multiple buses arranged in hierarchical form, any other type of bus, bus network, switch fabric, or other interconnection technology. Communications fabric 82 supports transfer of data, commands, and other information between various subsystems of computing device 80.

Processor unit 84 may be a programmable central processing unit (CPU) configured for executing programmed instructions stored in memory 86. In another illustrative example, processor unit 84 may be implemented using one or more heterogeneous processor systems in which a main processor is present with secondary processors on a single chip. In yet another illustrative example, processor unit 84 may be a symmetric multi-processor system containing multiple processors of the same type. Processor unit 84 may be a complex instruction set computing (CISC) microprocessor such as a z/10 or other z/Architecture processor from IBM® Corporation, a reduced instruction set computing (RISC) microprocessor such as a PowerPC® processor from IBM® Corporation, an x86 compatible processor such as a Pentium® processor from Intel® Corporation, an Athlon® processor from Advanced Micro Devices® Corporation, or any other suitable processor. In various examples, processor unit 84 may include a multi-core processor, such as a dual core or quad core processor, for example. Processor unit 84 may include multiple processing chips on one die, and/or multiple dies on one package or substrate, for example. Processor unit 84 may also include one or more levels of integrated cache memory, for example. In various examples, processor unit 84 may comprise one or more CPUs distributed across one or more locations.

Data storage 96 includes memory 86 and persistent data storage 88, which are in communication with processor unit 84 through communications fabric 82. Memory 86 can include a random access semiconductor memory (RAM) for storing application data, i.e., computer program data, for processing. While memory 86 is depicted conceptually as a single monolithic entity, in various examples, memory 86 may be arranged in a hierarchy of caches and in other memory devices, in a single physical location, or distributed across a plurality of physical systems in various forms. While memory 86 is depicted physically separated from processor unit 84 and other elements of computing device 80, memory 86 may refer equivalently to any intermediate or cache memory at any location throughout computing device 80, including cache memory proximate to or integrated with processor unit 84 or individual cores of processor unit 84.

Persistent data storage 88 may include one or more hard disk drives, solid state drives, flash drives, rewritable optical disc drives, magnetic tape drives, or any combination of these or other data storage media. Persistent data storage 88 may store computer-executable instructions or computer-readable program code for an operating system, application files comprising program code, data structures or data files, and any other type of data. These computer-executable instructions may be loaded from persistent data storage 88 into memory 86 to be read and executed by processor unit 84 or other processors. Data storage 96 may also include any other hardware elements capable of storing information, such as, for example and without limitation, data, program code in functional form, and/or other suitable information, either on a temporary basis and/or a permanent basis.

Persistent data storage 88 and memory 86 are examples of physical, tangible, non-transitory computer-readable data storage devices. Data storage 96 may include any of various forms of volatile memory that may require being periodically electrically refreshed to maintain data in memory, while those skilled in the art will recognize that this also constitutes an example of a physical, tangible, non-transitory computer-readable data storage device. Executable instructions may be stored on a non-transitory medium when program code is loaded, stored, relayed, buffered, or cached on a non-transitory physical medium or device, including if only for only a short duration or only in a volatile memory format.

Processor unit 84 can also be suitably programmed to read, load, and execute computer-executable instructions or computer-readable program code for an indexing management tool 22, as described in greater detail above. This program code may be stored on memory 86, persistent data storage 88, or elsewhere in computing device 80. This program code may also take the form of program code 104 stored on computer-readable medium 102 comprised in computer program product 100, and may be transferred or communicated, through any of a variety of local or remote means, from computer program product 100 to computing device 80 to be enabled to be executed by processor unit 84, as further explained below.

The operating system may provide functions such as device interface management, memory management, and multiple task management. The operating system can be a mainframe operating system such as the z/OS operating system from IBM® Corporation, a Unix based operating system such as the AIX® operating system from IBM® Corporation, a non-Unix based operating system such as the Windows® family of operating systems from Microsoft® Corporation, a network operating system such as JavaOS® from Oracle® Corporation, or any other suitable operating system. Processor unit 84 can be suitably programmed to read, load, and execute instructions of the operating system.

Communications unit 90, in this example, provides for communications with other computing or communications systems or devices. Communications unit 90 may provide communications through the use of physical and/or wireless communications links. Communications unit 90 may include a network interface card for interfacing with a LAN 16, an Ethernet adapter, a Token Ring adapter, a modem for connecting to a transmission system such as a telephone line, or any other type of communication interface. Communications unit 90 can be used for operationally connecting many types of peripheral computing devices to computing device 80, such as printers, bus adapters, and other computers. Communications unit 90 may be implemented as an expansion card or be built into a motherboard, for example.

The input/output unit 92 can support devices suited for input and output of data with other devices that may be connected to computing device 80, such as keyboard, a mouse or other pointer, a touchscreen interface, an interface for a printer or any other peripheral device, a removable magnetic or optical disc drive (including CD-ROM, DVD-ROM, or Blu-Ray), a universal serial bus (USB) receptacle, or any other type of input and/or output device. Input/output unit 92 may also include any type of interface for video output in any type of video output protocol and any type of monitor or other video display technology, in various examples. It will be understood that some of these examples may overlap with each other, or with example components of communications unit 90 or data storage 96. Input/output unit 92 may also include appropriate device drivers for any type of external device, or such device drivers may reside elsewhere on computing device 80 as appropriate.

Computing device 80 also includes a display adapter 94 in this illustrative example, which provides one or more connections for one or more display devices, such as display device 98, which may include any of a variety of types of display devices. It will be understood that some of these examples may overlap with example components of communications unit 90 or input/output unit 92. Input/output unit 92 may also include appropriate device drivers for any type of external device, or such device drivers may reside elsewhere on computing device 80 as appropriate. Display adapter 94 may include one or more video cards, one or more graphics processing units (GPUs), one or more video-capable connection ports, or any other type of data connector capable of communicating video data, in various examples. Display device 98 may be any kind of video display device, such as a monitor, a television, or a projector, in various examples.

Input/output unit 92 may include a drive, socket, or outlet for receiving computer program product 100, which comprises a computer-readable medium 102 having computer program code 104 stored thereon. For example, computer program product 100 may be a CD-ROM, a DVD-ROM, a Blu-Ray disc, a magnetic disk, a USB stick, a flash drive, or an external hard disk drive, as illustrative examples, or any other suitable data storage technology.

Computer-readable medium 102 may include any type of optical, magnetic, or other physical medium that physically encodes program code 104 as a binary series of different physical states in each unit of memory that, when read by computing device 80, induces a physical signal that is read by processor 84 that corresponds to the physical states of the basic data storage elements of storage medium 102, and that induces corresponding changes in the physical state of processor unit 84. That physical program code signal may be modeled or conceptualized as computer-readable instructions at any of various levels of abstraction, such as a high-level programming language, assembly language, or machine language, but ultimately constitutes a series of physical electrical and/or magnetic interactions that physically induce a change in the physical state of processor unit 84, thereby physically causing or configuring processor unit 84 to generate physical outputs that correspond to the computer-executable instructions, in a way that causes computing device 80 to physically assume new capabilities that it did not have until its physical state was changed by loading the executable instructions comprised in program code 104.

In some illustrative examples, program code 104 may be downloaded over a network to data storage 96 from another device or computer system for use within computing device 80. Program code 104 comprising computer-executable instructions may be communicated or transferred to computing device 80 from computer-readable medium 102 through a hard-line or wireless communications link to communications unit 90 and/or through a connection to input/output unit 92. Computer-readable medium 102 comprising program code 104 may be located at a separate or remote location from computing device 80, and may be located anywhere, including at any remote geographical location anywhere in the world, and may relay program code 104 to computing device 80 over any type of one or more communication links, such as the Internet and/or other packet data networks. The program code 104 may be transmitted over a wireless Internet connection, or over a shorter-range direct wireless connection such as wireless LAN, Bluetooth™, Wi-Fi™, or an infrared connection, for example. Any other wireless or remote communication protocol may also be used in other implementations.

The communications link and/or the connection may include wired and/or wireless connections in various illustrative examples, and program code 104 may be transmitted from a source computer-readable medium 102 over non-tangible media, such as communications links or wireless transmissions containing the program code 104. Program code 104 may be more or less temporarily or durably stored on any number of intermediate tangible, physical computer-readable devices and media, such as any number of physical buffers, caches, main memory, or data storage components of servers, gateways, network nodes, mobility management entities, or other network assets, en route from its original source medium to computing device 80.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
    determining, by at least one processor of a computing device, an order of collections of records by sorting the collections of records according to a byte length of an index key for each collection of records of the collections of records, wherein the byte length of the index key for each collection of records of the collections of records corresponds to a sum of byte lengths of one or more columns in the respective collection of records;
    identifying, by the at least one processor, subsets of the collections of records as having index keys of equal byte length;
    modifying, by the at least one processor, the order of the collections of records by sorting each subset of the collections of records of the subsets of the collections of records identified as having index keys of equal byte length according to a number of records per collection;
    and assigning, by the at least one processor, the collections of records to a plurality of parallel processing tasks based on the modified order of the collections of records, including assigning a respective two or more consecutive collections of records of the collections of records according to the modified order of the collections of records to each parallel processing task of the plurality of parallel processing tasks,
    wherein assigning the collections of records to the plurality of parallel processing tasks comprises:
    determining an accumulated total number of the records assigned to a particular parallel processing task among the plurality of parallel processing tasks based at least in part on a number of records among the collections of records currently assigned to the particular parallel processing task and any previously addressed parallel processing tasks among the plurality of parallel processing tasks;
    determining an accumulated average number of the records assigned to the particular parallel processing task based at least in part on determining an average number of records among the collections of records per parallel processing task among the plurality of parallel processing tasks and accumulating the average number of records over the previously addressed parallel processing tasks and the particular parallel processing task;
    assigning an initial portion of the collections of records to the particular parallel processing task in the order of the collections of records while the accumulated total number of the records assigned to the particular parallel processing task is less than the accumulated average number of records assigned to the particular parallel processing task;
    and sending, by the computing device, the collections of records to a plurality of processing units in accordance with the assigning of the collections of records to the plurality of parallel processing tasks in the order of the collections of records, wherein each of the processing units is available to execute a respective one of the parallel processing tasks.

2. The method of claim 1, wherein sorting the collections of records according to the byte length of the index key for each collection of records of the collections of records comprises:
    sorting the collections of records in a descending order of the byte length of the index key for each collection of records of the collections of records.

3. The method of claim 1, wherein modifying the order of the collections of records within the identified according to a number of records per collection comprises:
    modifying the order of the collections of records within the identified subsets in a descending order of the number of records per collection.

4. The method of claim 1, wherein assigning the collections of records to the plurality of parallel processing tasks further comprises:
    assigning a subsequent portion of the collections of records to an additional parallel processing task among the plurality of parallel processing tasks, in the order of the collections of records, while the accumulated total number of the records assigned to the additional parallel processing task is less than the accumulated average number of records assigned to the additional parallel processing task.

5. The method of claim 1, wherein assigning the collections of records to the plurality of parallel processing tasks further comprises:
    assigning further portions of the collections of records to further parallel processing tasks among the plurality of parallel processing tasks, in the order of the collections of records, until each of the collections of records has been assigned to one of the parallel processing tasks.

6. The method of claim 1, wherein assigning the collections of records to the plurality of parallel processing tasks further comprises:
    responsive to the accumulated total number of the records assigned to the additional parallel processing task becoming greater than the accumulated average number of records assigned to the additional parallel processing task, performing a comparison of a computing resource overhead of assigning subsequent collections of records from the collections of records to either the particular parallel processing task or an additional parallel processing task among the plurality of parallel processing tasks; and assigning the subsequent collections of records to either the particular parallel processing task or the additional parallel processing task based on which of the particular parallel processing task or the additional parallel processing task has a lower computing resource overhead based on the comparison.

7. The method of claim 1, wherein assigning the collections of records to the plurality of parallel processing tasks comprises:

assigning respective portions of the collections of records to respective parallel processing tasks in the order of the collections of records such that index key padding of unequal index keys of the collections of records in the parallel processing tasks is reduced in comparison to the collections of records being assigned to the respective parallel processing tasks without the order of the collections of records.

8. A computer program product for assigning collections of records to parallel processing tasks for sorting index keys of the records, the computer program product comprising a non-transitory computer-readable storage medium having program code embodied therewith, the program code executable by a computing device to:

determine an order of collections of records by sorting the collections of records in a descending order according to a byte length of an index key for each collection of records of the collections of records, wherein the byte length of the index key for each collection of records of the collections of records corresponds to a sum of byte lengths of one or more columns in the respective collection of records;

identify subsets of the collections of records as having index keys of equal byte length;

modify the order of the collections of records by sorting each subset of the collections of records of the subsets of the collections of records identified as having index keys of equal byte length according to a number of records per collection;

and assign the collections of records to a plurality of parallel processing tasks based on the modified order of the collections of records, including assigning a respective two or more consecutive collections of records of the collections of records according to the modified order of the collections of records to each parallel processing task of the plurality of parallel processing tasks, wherein the program code executable by the computing device to assign the collections of records to the plurality of parallel processing tasks comprises program code executable by the computing device to:

determine an accumulated total number of the records assigned to a particular parallel processing task among the plurality of parallel processing tasks based at least in part on a number of records among the collections of records currently assigned to the particular parallel processing task and any previously addressed parallel processing tasks among the plurality of parallel processing tasks;

determine an accumulated average number of the records assigned to the particular parallel processing task based at least in part on determining an average number of records among the collections of records per parallel processing task among the plurality of parallel processing tasks and accumulating the average number of records over the previously addressed parallel processing tasks and the particular parallel processing task;

assign an initial portion of the collections of records to the particular parallel processing task in the order of the collections of records while the accumulated total number of the records assigned to the particular parallel processing task is less than the accumulated average number of records assigned to the particular parallel processing task;

and sending, by the computing device, the collections of records to a plurality of processing units in accordance with the assigning of the collections of records to the plurality of parallel processing tasks in the order of the collections of records, wherein each of the processing units is available to execute a respective one of the parallel processing tasks.

9. The computer program product of claim 8, wherein the program code to assign the collections of records to the plurality of parallel processing tasks further comprises:

program code to assign a subsequent portion of the collections of records to an additional parallel processing task among the plurality of parallel processing tasks, in the order of the collections of records, while the accumulated total number of the records assigned to the additional parallel processing task is less than the accumulated average number of records assigned to the additional parallel processing task.

10. The computer program product of claim 8, wherein the program code to assign the collections of records to the plurality of parallel processing tasks further comprises:

program code to assign further portions of the collections of records to further parallel processing tasks among the plurality of parallel processing tasks, in the order of the collections of records, until each of the collections of records has been assigned to one of the parallel processing tasks.

11. The computer program product of claim 8 wherein the program code to assign the collections of records to the plurality of parallel processing tasks further comprises:

program code to make, responsive to the accumulated total number of the records assigned to the additional parallel processing task becoming greater than the accumulated average number of records assigned to the additional parallel processing task, a comparison of a computing resource overhead of assigning a subsequent collections of records from the collections of records to either the particular parallel processing task or an additional parallel processing task among the plurality of parallel processing tasks; and program code to assign the subsequent collections of records to either the particular parallel processing task or the additional parallel processing task based on which of the parallel processing tasks has a lower computing resource overhead based on the comparison.

12. The computer program product of claim 8, wherein the program code to assign the collections of records to the plurality of parallel processing tasks comprises:

program code to assign respective portions of the collections of records to respective parallel processing tasks in the order of the collections of records such that index key padding of unequal index keys of the collections of records in the parallel processing tasks is less than if the collections of records were assigned to the respective parallel processing tasks without the order of the collections of records.

13. A computer system for assigning collections of records to parallel processing tasks for sorting index keys of the records, the computer system comprising:
- one or more processors, one or more computer-readable memories, and one or more computer-readable, tangible storage devices;
- program instructions, stored on at least one of the one or more storage devices for execution by at least one of the one or more processors via at least one of the one or more memories, to determine an order of collections of records by sorting the collections of records in a descending order according to a byte length of an index key of each collection of records of the collections of records, wherein the byte length of the index key for each collection of records of the collections of records corresponds to a sum of byte lengths of one or more columns in the respective collection of records;
- program instructions, stored on at least one of the one or more storage devices for execution by at least one of the one or more processors via at least one of the one or more memories, to identify subsets of the collections of records as having index keys of equal byte length;
- program instructions, stored on at least one of the one or more storage devices for execution by at least one of the one or more processors via at least one of the one or more memories, to modify the order of the collections of records in a descending order, by sorting each subset of the collections of records of the subsets of the collections of records identified as having index keys of equal byte length, according to number of records per collection;
- and program instructions, stored on at least one of the one or more storage devices for execution by at least one of the one or more processors via at least one of the one or more memories, to assign the collections of records to a plurality of parallel processing tasks in the modified order of the collections of records, including assigning a respective two or more consecutive collections of records of the collections of records according to the modified order of the collections of records to each parallel processing task of the plurality of parallel processing tasks,
- wherein the program instructions to assign the collections of records to the plurality of parallel processing tasks comprises:
- program instructions to determine an accumulated total number of the records assigned to a particular parallel processing task among the plurality of parallel processing tasks based at least in part on a number of records among the collections of records currently assigned to the particular parallel processing task and any previously addressed parallel processing tasks among the plurality of parallel processing tasks;
- program instructions to determine an accumulated average number of the records assigned to the particular parallel processing task based at least in part on determining an average number of records among the collections of records per parallel processing task among the plurality of parallel processing tasks and accumulating the average number of records over the previously addressed parallel processing tasks and the particular parallel processing task;
- program instructions to assign an initial portion of the collections of records to the particular parallel processing task in the order of the collections of records while the accumulated total number of the records assigned to the particular parallel processing task is less than the accumulated average number of records assigned to the particular parallel processing task;
- and sending, by the computing device, the collections of records to a plurality of processing units in accordance with the assigning of the collections of records to the plurality of parallel processing tasks in the order of the collections of records, wherein each of the processing units is available to execute a respective one of the parallel processing tasks.

14. The computer system of claim 13, wherein the program instructions to assign the collections of records to the plurality of parallel processing tasks further comprise:
- program instructions to assign a subsequent portion of the collections of records to an additional parallel processing task among the plurality of parallel processing tasks, in the order of the collections of records, while the accumulated total number of the records assigned to the additional parallel processing task is less than the accumulated average number of records assigned to the additional parallel processing task.

15. The computer system of claim 13, wherein the program instructions to assign the collections of records to the plurality of parallel processing tasks further comprise:
- program instructions to assign further portions of the collections of records to further parallel processing tasks among the plurality of parallel processing tasks, in the order of the collections of records, until each of the collections of records has been assigned to one of the parallel processing tasks.

16. The computer system of claim 13, wherein the program instructions to assign the collections of records to the plurality of parallel processing tasks further comprise:
- program instructions to make, responsive to the accumulated total number of the records assigned to the additional parallel processing task becoming greater than the accumulated average number of records assigned to the additional parallel processing task, a comparison of a computing resource overhead of assigning a subsequent collections of records from the collections of records to either the particular parallel processing task or an additional parallel processing task among the plurality of parallel processing tasks; and
- program instructions to assign the subsequent collections of records to either the particular parallel processing task or the additional parallel processing task based on which of the parallel processing tasks has a lower computing resource overhead based on the comparison.

* * * * *